United States Patent
Demura

(10) Patent No.: US 9,361,719 B1
(45) Date of Patent: Jun. 7, 2016

(54) LABEL PLACEMENT ON A DIGITAL MAP

(71) Applicant: GOOGLE INC., Mountain View, CA (US)

(72) Inventor: Igor Demura, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 260 days.

(21) Appl. No.: 14/228,622

(22) Filed: Mar. 28, 2014

(51) Int. Cl.
*G09G 5/00* (2006.01)
*G06T 11/60* (2006.01)

(52) U.S. Cl.
CPC ............ *G06T 11/60* (2013.01); *G06T 2200/28* (2013.01); *G06T 2200/32* (2013.01)

(58) Field of Classification Search
None
See application file for complete search history.

(56) References Cited

U.S. PATENT DOCUMENTS

| | | | | |
|---|---|---|---|---|
| 4,914,605 A * | 4/1990 | Loughmiller, Jr. | | G01C 21/3673 340/995.1 |
| 5,600,768 A * | 2/1997 | Andresen | ............... | G06T 11/60 345/629 |
| 6,727,909 B1 * | 4/2004 | Matsumura | ............. | G06T 11/60 345/629 |
| 6,940,530 B2 * | 9/2005 | Chen | ....................... | G06T 17/05 345/629 |
| 6,985,161 B1 * | 1/2006 | Politis | ..................... | G06T 11/60 345/629 |
| 7,139,970 B2 * | 11/2006 | Michaud | ........... | G06F 17/30905 345/629 |
| 7,474,317 B2 * | 1/2009 | Dolph | ................. | G06F 3/04817 345/619 |
| 7,907,151 B2 * | 3/2011 | Daviss | ..................... | G06T 11/60 345/629 |
| 8,462,378 B2 * | 6/2013 | Takeda | .................. | G03G 15/36 345/629 |
| 2004/0032417 A1 * | 2/2004 | Chen | ........................ | G06T 17/05 345/636 |
| 2004/0165000 A1 * | 8/2004 | Nagahashi | ............. | G06T 11/60 345/629 |
| 2005/0251331 A1 * | 11/2005 | Kreft | ....................... | G01C 3/08 701/438 |
| 2007/0268313 A1 * | 11/2007 | Dolph | ................. | G06F 3/04817 345/635 |
| 2012/0194547 A1 * | 8/2012 | Johnson | .................. | G06T 11/00 345/632 |
| 2013/0093787 A1 * | 4/2013 | Fulks | ..................... | G06T 11/60 345/629 |

OTHER PUBLICATIONS

Christensen et al., "An Empirical Study of Algorithms for Point-Feature Label Placement," ACM Transactions on Graphics (1995).
Edmondson et al., "A General Cartographic Labeling Algorith," Mitsubishi Electric Research Laboratories, 33(4):13-23 (1996).
Poon et al., "A Polynomial Time Solution for Labeling a Rectilinear Map," Research Gate (1997). Retrieved from the Internet on Feb. 26, 2014: URL:http://researchgate.net/publication/220983846_A_Polynomial_Time_Solution_for_Labeling_a_Rectilinear_Map.
Ribeiro et al., "Heuristics for Cartographic Label Placement Problems," Computer and Applied Mathematics Laboratory (2006).

* cited by examiner

*Primary Examiner* — Ryan R Yang
(74) *Attorney, Agent, or Firm* — Marshall, Gerstein & Borun LLP

(57) ABSTRACT

To place labels on a digital map, indications of dimensions and positions for candidate labels for placement within a bounded region of a digital map are received. The bounded region is partitioned into bands parallel to an axis. For each of the bands, a respective subset of the candidate labels is identified, such that such that each label in the subset is at least partially disposed in the band. Non-overlapping labels are iteratively selected from the subset based at least on one of the edges of the labels in the subset perpendicular to the axis. A result set if generated using the respective selections of non-overlapping labels for the bands. The labels in the result set are placed on the digital map.

20 Claims, 16 Drawing Sheets

AS = {}

NS = {a, b, c}

NS = {a, b, c}

NS = {a, c}

NS = {c}

NS = {}

NS = {s}

NS = {x, u}

NS = {x}

NS = {x, y}

NS = {x}
RS = {a, b, c, s, u, x, y}

NS = {}
Result = {a, b, c, s, u, x, y}

LABEL PLACEMENT ON A DIGITAL MAP

FIELD OF THE DISCLOSURE

The present disclosure relates to digital maps and, more particularly, to selecting sets of non-intersecting labels for display on a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many computing devices, including portable devices, support software applications that display interactive digital maps. Some of these software applications are developed primarily for providing interactive digital maps. Other software applications, such as web browsers, may display interactive digital maps along with other content. Often, these digital maps display numerous geographic features (e.g., roads, cities, neighborhoods, points of interest) that have names, numerical designations, or other identifiers. These identifiers are often displayed as alphanumeric labels overlaying the digital map. When the amount of information displayed in viewport is large, such as when the map displays an urban area, it is difficult to display numerous labels at the same time without overlap.

SUMMARY

A label placement engine of this disclosure implements a heuristic algorithm for efficiently placing labels on a digital map in a non-overlapping manner. Each label corresponds to a geometric shape such as a rectangle of a certain size, and each label has a specific location or a set of possible locations on the map. Generally speaking, the label placement engine can break up a bounded region, corresponding to a digital map on which labels are to be placed, into several parallel bands, order the labels within each band, and select non-overlapping labels within each band in view of the order. The label placement engine then can refine the solution by advancing a virtual scan line in a direction perpendicular to the orientation of the parallel bands and identify non-overlapping labels that have not been previously selected as part of the solution. In this manner, the label placement engine processes labels as an O(n log n) function, irrespective of label topology.

More particularly, one embodiment of these techniques is a system for placing labels on digital maps in a non-overlapping manner. The system includes a non-transitory computer-readable memory storing indications of dimensions and positions for candidate labels for placing within a bounded region of a digital map. The system also includes processing hardware coupled to the computer-readable memory. The processing hardware is configured to partition the bounded region into several bands parallel to an axis and, for each of the bands: (i) identify a respective subset of the candidate labels, such that each label in subset is at least partially disposed in the band, and (ii) iteratively select non-overlapping labels from the subset based at least on one of the edges of the labels in the subset perpendicular to the axis. The processing hardware is further configured to generate a result set using the respective selections of non-overlapping labels for plurality of bands, and cause the labels in the result set to be placed on the digital map.

Another embodiment of these techniques is a method for placing labels on digital maps in a non-overlapping manner. The method includes receiving indications of dimensions and positions for candidate labels for placing within a bounded region of a digital map. The method further includes partitioning the bounded region into bands parallel to an axis and, for each of the bands, (i) identifying a respective subset of the candidate labels, such that each label in the subset is at least partially disposed in the band, and (ii) iteratively selecting non-overlapping labels from the subset based at least on one of the edges of the labels in the subset perpendicular to the axis. The method further includes generating a result set using the respective selections of non-overlapping labels for the bands, and causing the labels in the result set to be placed on the digital map.

Still another embodiment of the techniques of this disclosure is a method for efficiently selecting non-overlapping shapes from candidate shapes. The method includes receiving shape data indicating positions and dimensions for candidate substantially rectangular shapes for placement within a bounded region. The method further includes generating a result set including several of the candidate shapes, where each shape in the result set does not overlap any of the other shapes in the subset, by separately processing subsets of the shapes corresponding to respective virtual parallel bands that make up the bounded region. The method also includes augmenting the result set with a shape included among the candidate shapes that does not overlap any of the shapes in the result set, by advancing a virtual scan line in a direction perpendicular to an orientation of the virtual parallel bands.

DETAILED DESCRIPTION

Figure 1:
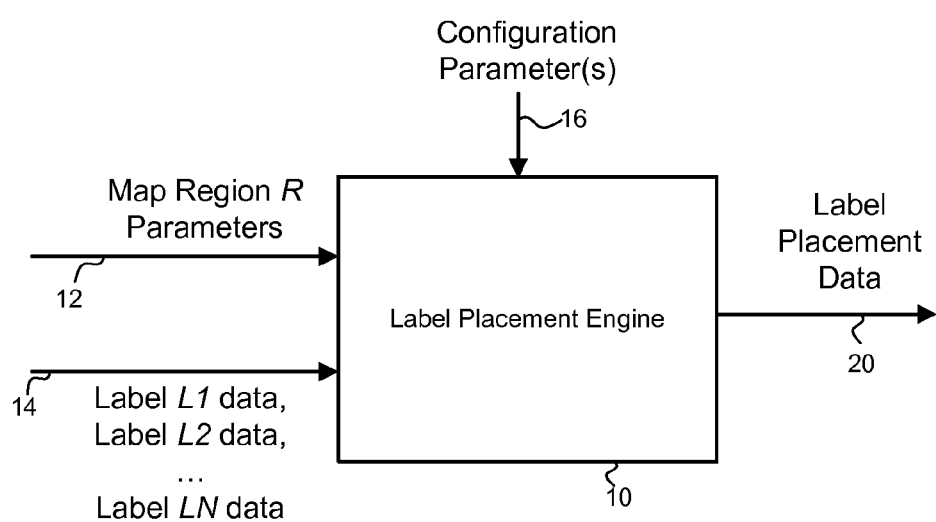
FIG. 1 is a block diagram of an example label placement engine of this disclosure.

FIG. 1 illustrates an example label placement engine 10 that efficiently selects a set of non-overlapping labels from among multiple candidate labels, each having certain dimensions and one or more possible locations on a map. The label placement engine 10 receives parameters 12 defining a map region on which the labels are placed. The parameters 12 can specify the width and length of region R, for example. The label placement engine 10 also receives label data 14, which describes dimensions of labels (e.g., height and width) as well as one or several positions at which these labels can be placed. For example, a label identifying the Guggenheim Museum in New York City can be placed over or near the depiction of the building on a digital map. In the situations described below, the number of available labels for region R is sufficiently large to produce a number of "collisions" between labels, or areas where labels at least partially overlap. For example, a map depicting several densely populated urban blocks can include labels identifying streets, various businesses, bus stops, etc.

The label placement engine 10 in this example implementation also receives configuration parameters 16. As discussed in more detail below, the configuration parameters 16 can specify, for example, how region R should be partitioned into parallel bands when selecting subsets of non-overlapping labels, and how many labels should be considered during each pass through a band. The configuration parameters 16 can be retrieved from a configuration file or an operator, if desired.

Using the inputs 12, 14, and 16, the label placement engine 10 generates label placement data 20, which indicates which of the candidate labels can be placed on the map, and at which locations (when alternative positions are available). To this end, the label placement engine 10 can implement an algorithm discussed below with reference to FIGS. 2A-4.

In general, the algorithm which the label placement engine 10 implements can be used to efficiently identify a subset of non-overlapping shapes within a larger set of shapes while maximizing the size of the subset. Further, the algorithm can be extended by inscribing non-rectangular shapes inside bounding rectangles. For ease of illustration, however, the examples below refer specifically to rectangular shapes being placed on a digital map.

Example Application of Algorithm

Figure 2A:
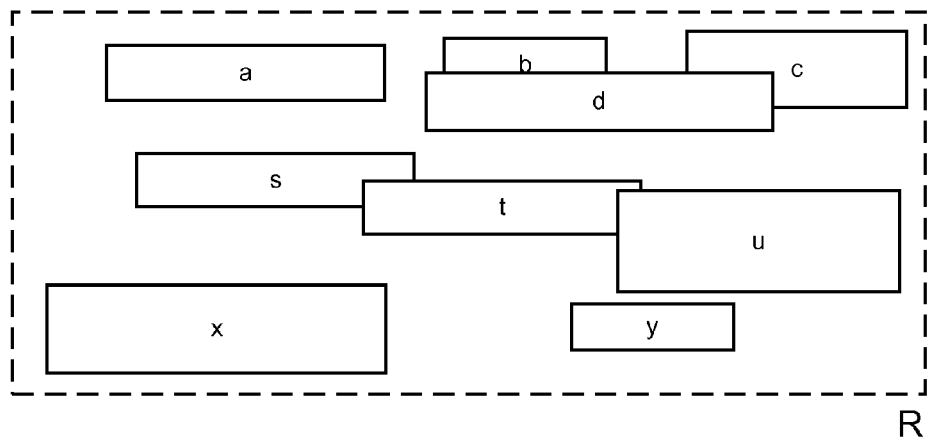
FIGS. 2A-N illustrate application of the algorithm of this disclosure to an example set of labels, according to one implementation.

Referring first to FIG. 2A, an example set of candidate rectangular labels L={a, b, c, d, s, t, u, x, y} are displayed in their respective positions in region R. There may be alternative positions defined for some or all of these labels. However, for clarity, an application of the algorithm of the label placement engine 10 is first illustrated with respect to single allowed positions of the labels, and an extension of the algorithm to alternative positions of labels is discussed with reference to FIG. 4.

The following overlaps between labels can be observed in the example configuration of FIG. 2A: b and d, d and c, s and t, t and u. Generally speaking, different sets of non-overlapping labels can be selected from the set L. For example, one solution can be S1={a, d, t, x, y}, with labels b, d, s, and u dropped because of the overlaps with one or more labels in the set S1. Another solution can be S2={a, b, c, t, x, y}, with labels d, s, and u dropped because of the overlaps with one or more labels in the set S2. The label placement engine 10 accordingly attempts to find a solution that accommodates as many labels as possible without selecting overlapping labels.

Figure 2B:
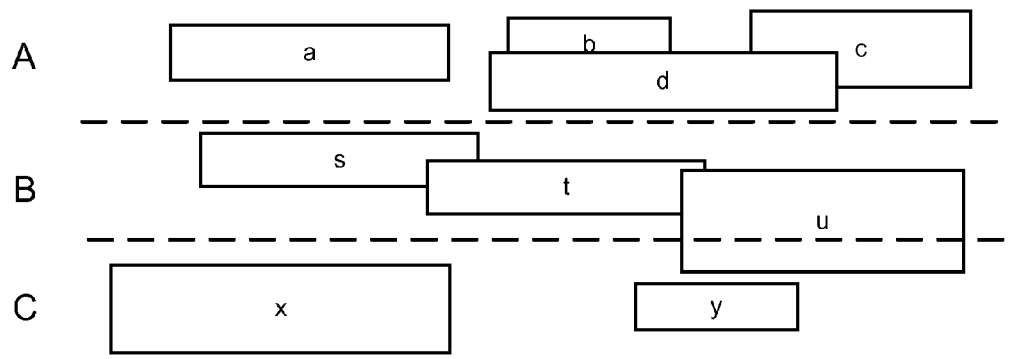

As illustrated in FIG. 2B, the label placement engine 10 partitions region R into bands A, B, and C. Band A includes labels a, b, c, and d; band B includes labels s, t, and u; and band C includes labels x, y, and u. For the purposes of the algorithm, label u lies in band B as well as band C. The bands in this example are parallel and adjacent to each other, non-overlapping, and have the same height. In other implementations, the bands need not be of the same heights. Further, the orientation of the bands in general can be horizontal or vertical. The height of the bands can be a function of the average height of the labels in region R. In an example implementation, the height of the bands is equal to the average height of the labels. Further, the height of the bands can be selected via the configuration parameters 16 (see FIG. 1).

The label placement engine 10 then begins to iteratively populate anchor set AS, which initially is empty, by processing each of the bands A-C individually. The label placement engine 10 starts with band A.

Figure 2C:
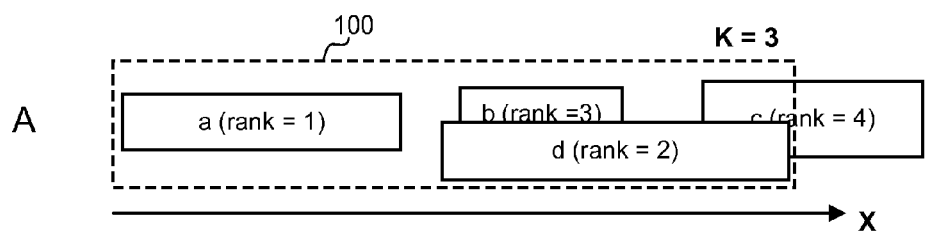

Now referring to FIG. 2C, the label placement engine 10 orders or ranks the rectangles in band A based on the left x-coordinate of each label. Thus, the rank of label a is 1, the rank of label d is 2, the rank of label b is 3, and the rank of label c is 4. The label placement engine 10 then selects K labels that do not intersect any labels in anchor set AS in projection onto the x-axis, in view of the determined ranks. The selection of K labels is schematically illustrated in FIG. 2C as window 100. The value of K in this example implementation is 3. Generally speaking, K can be any suitable value such as 5, 6, 10, etc. If the value of K is sufficiently large, the label placement engine 10 effectively considers the entire band A within a single window 100. However, selecting a very large size for the window 100 can slow down the algorithm: because the label placement engine 10 iteratively searches for a label with the lowest right x-coordinate (as discussed below with reference to FIGS. 2D-2N), the O(n) cost of this operation can slow down the overall algorithm to $O(n^2)$ from O(n log n). On the other hand, selecting a moderately small size for the window 100 (e.g., K~12) will preserve the overall O(n log n) order of the algorithm. In some implementations, the value of K is controlled via the configuration parameters 16.

Figure 2D:
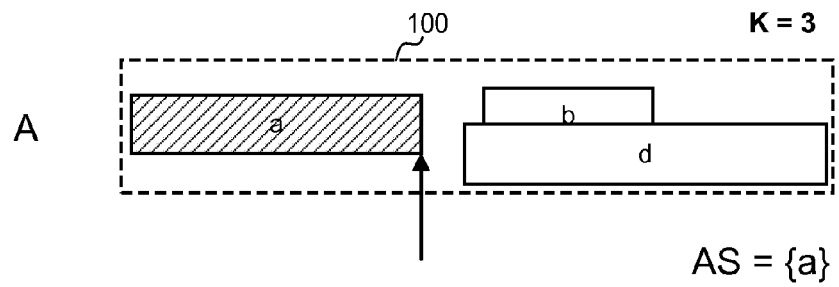

Referring to FIG. 2D, the label placement engine 10 then conducts a forward "scan" starting with the leftmost label in the window 100, and selects the label with the lowest right x-coordinate, from among the K labels. In this case, the label placement engine 10 selects label a, so that anchor set AS is now {a}.

Figure 2E:
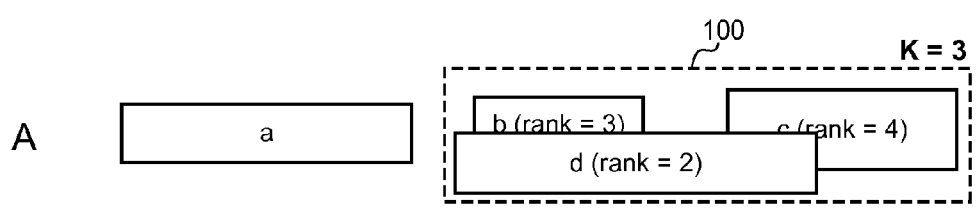
Figure 2F:
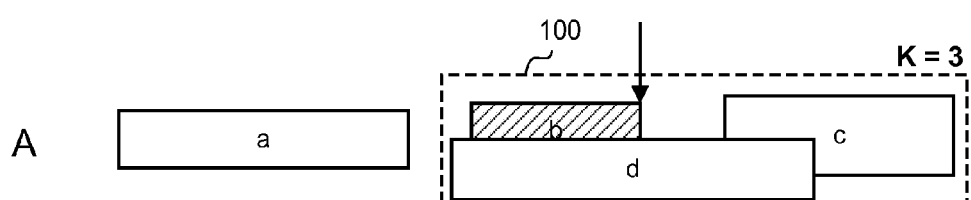

As illustrated in FIG. 2E, the label placement engine 10 advances the window 100 to include labels d, b, and c. Starting the scan with label d with the lowest rank, the label placement engine 10 identifies label b as the label within the window 100 with the lowest right x-coordinate that does not intersect any labels in anchor set AS when projected onto the x-axis (FIG. 2F). The label placement engine 10 accordingly add label b to anchor set AS, which now becomes {a, b}.

Figure 2G:
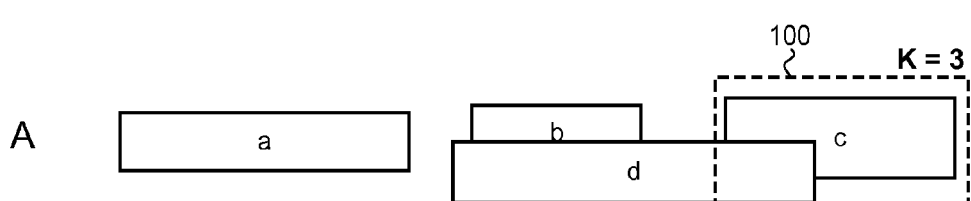
Figure 2H:
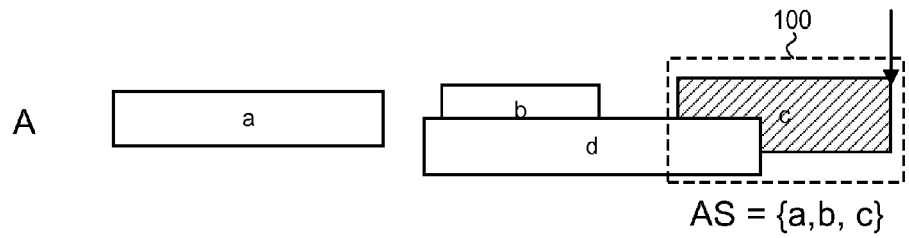

Referring to FIG. 2G, the label placement engine 10 advances the window 100 past the right edge of label b to include only label c. Because label c does not intersect any labels in anchor set AS when projected onto the x-axis, the label placement engine 10 adds this label to anchor set AS, which becomes {a, b, c} (FIG. 2H).

Figure 2I:
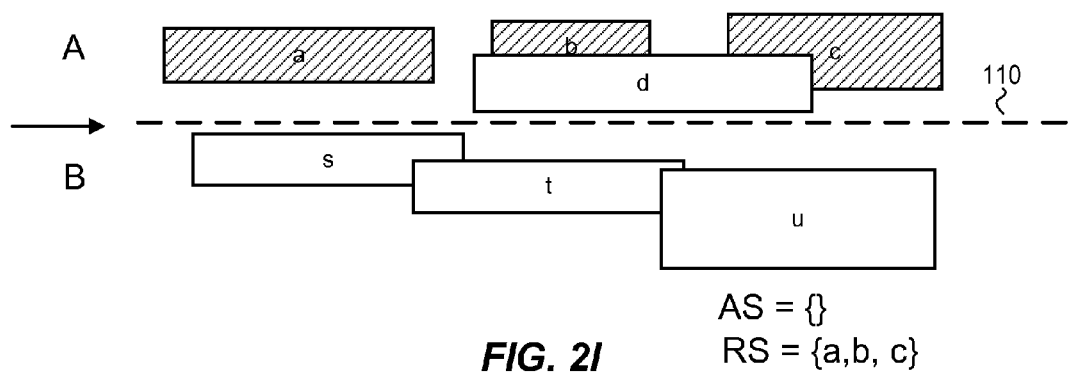

Now referring to FIG. 2I, the label placement engine 10 populates a preliminary result set RS with values a, b, and c from anchor set AS. The label placement engine 10 then removes from anchor set AS all labels that do not straddle the virtual line 110 separating bands A and B. Accordingly, anchor set AS now becomes empty.

Figure 2J:
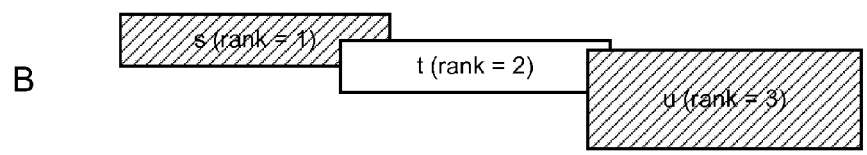
Figure 2K:
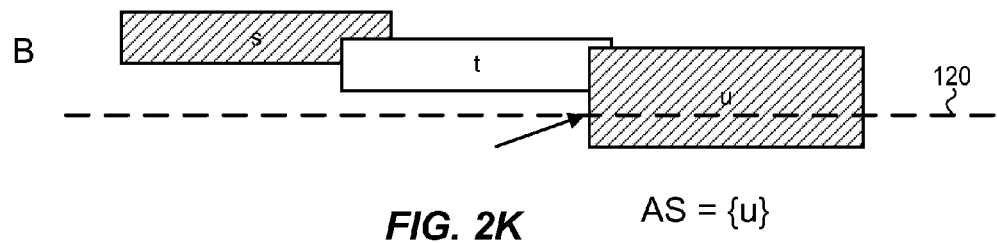

The label placement engine 10 can analyze the labels in band B in a similar manner. Thus, as illustrated in FIG. 2J, anchor set AS is populated with values s and u upon processing band B, and result set RS acquires two additional values and becomes {a, b, c, s, u}. However, unlike the transition from band A to B, the transition from band B to band C does not entirely empty anchor set AS. Because label u straddles virtual line 120 separating bands B and C, the label placement engine 10 begins to process band C with anchor set already including element u (FIG. 2K). In other words, when processing band C, the label placement engine 10 will look for labels that do not intersect label u in the projection onto the x-axis.

Figure 2L:
Figure 2M:
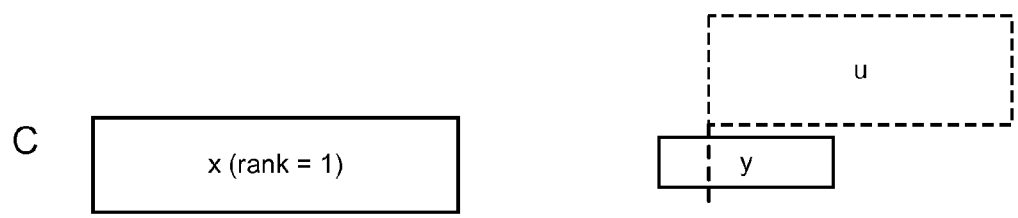

Referring to FIG. 2L, the label placement engine 10 assigns the rank of 1 to label x and the rank of 2 to label y. As illustrated in FIG. 2M, the label placement engine 10 then adds label x to anchor set AS, which now becomes {u, x}. The label placement engine 10 omits label y even though labels x and y do not intersect in their projections onto the x-axis because label y intersects with label u.

Figure 2N:
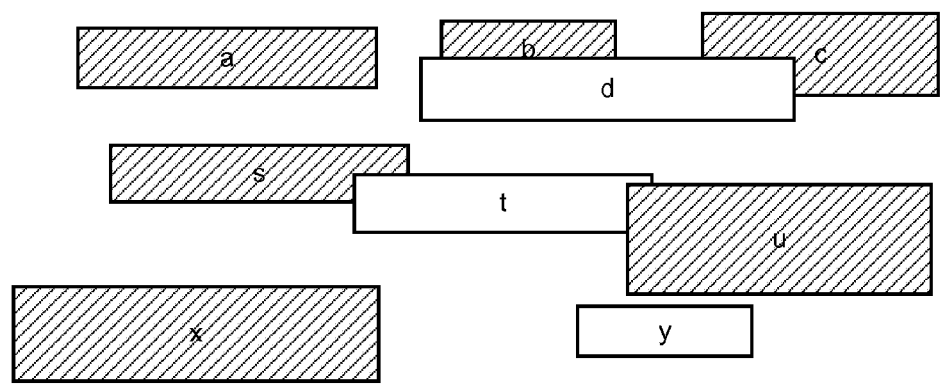

Now referring to FIG. 2N, after processing bands A, B, and C, result set RS becomes {a, b, c, s, u, and x}. The labels included in RS are illustrated in FIG. 2N using shading. It is clear from this simple label configuration that another label, label y, can be added to result set RS without creating overlaps between any of the pairs of labels. To identify omitted yet suitable labels in set L, the label placement engine 10 can execute a "refinement" stage of the algorithm, discussed next with reference to FIGS. 3A-P.

Figure 3A:
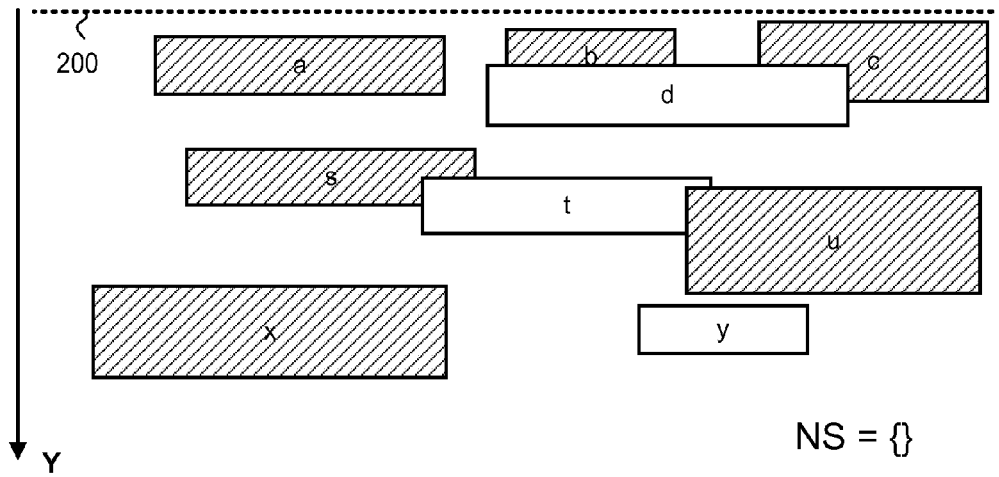
FIGS. 3A-Q illustrate application of a refinement stage of the algorithm of this disclosure to the example set of labels of FIGS. 2A-N, according to one implementation.

Referring to FIG. 3A, the label placement engine 10 advances a scan line 200 along the y-axis, i.e., in the direction perpendicular to the orientation of bands A-C. Generally speaking, the label placement engine 10 iteratively aligns the scan line 200 with horizontal edges of the labels and maintain a current set NS of non-intersecting labels. Set NS is initially empty.

Figure 3B:
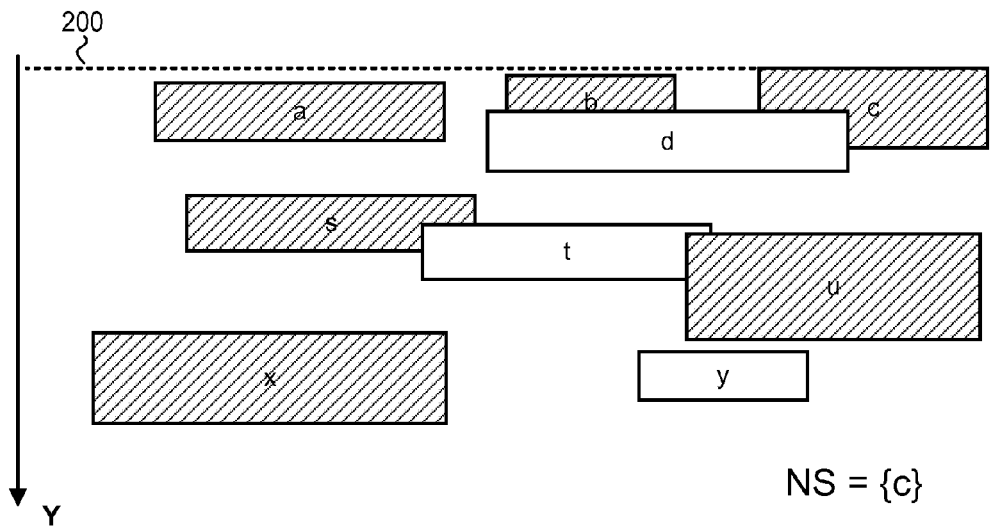

FIG. 3B illustrates the instance when the scan line 200 is aligned with the top edge of label c. One can imagine the scan line 200 "descend" from the position illustrated in FIG. 3A and "stop" upon aligning with a horizontal edge of a label, which in this case is label c. The label placement engine 10 checks whether label c is in result set RS and, upon determining that it is, adds label c to set NS. As a result, set NS is now {c}.

Figure 3C:
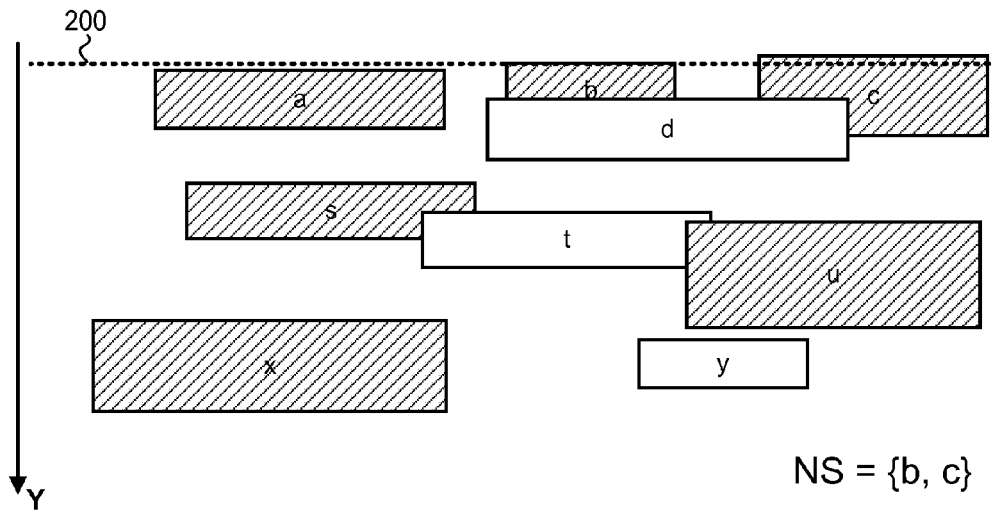
Figure 3D:
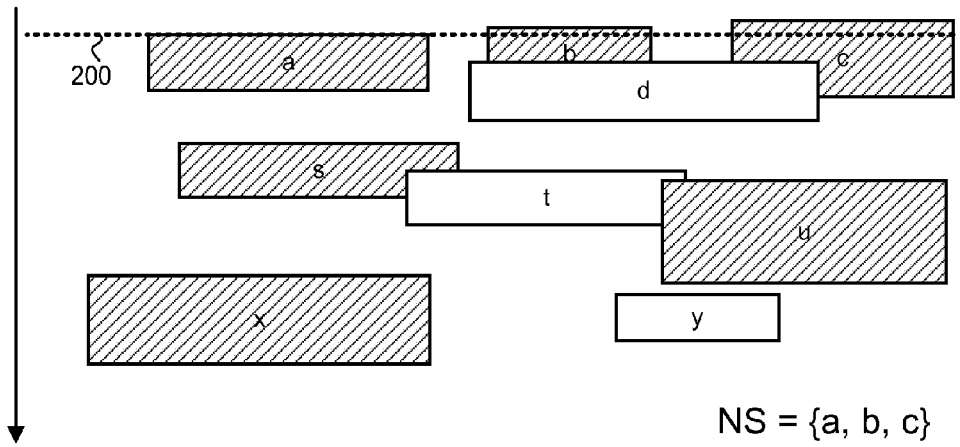

Referring to FIG. 3C, the label placement engine 10 next advances the scan line 200 to the top edge of label b and, upon completing a similar analysis, adds label b to set NS, which now becomes {b, c}. Similarly, when the label placement engine 10 advances the scan line 200 along the y-axis to the top edge of label a (FIG. 3D), the label placement engine 10 adds label a to set NS because label a is in result set RS. Set NS now becomes {a, b, c}.

Figure 3E:
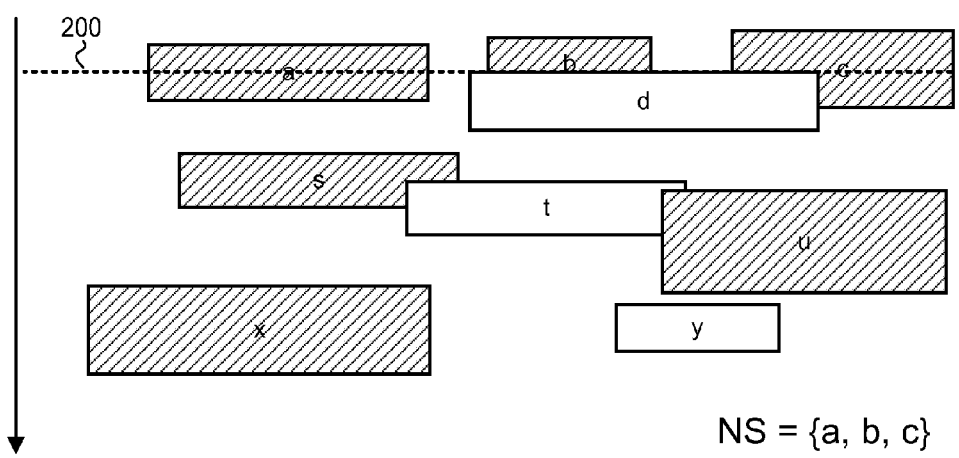

Referring to FIG. 3E, the label placement engine 10 further advances the scan line 200 to the top edge of label d. However, label d is not in result set RS. The label placement engine 10 then checks whether label d has intersections with labels in set NS. Because label d intersects with labels b and c, label d cannot be added to set NS.

Figure 3F:
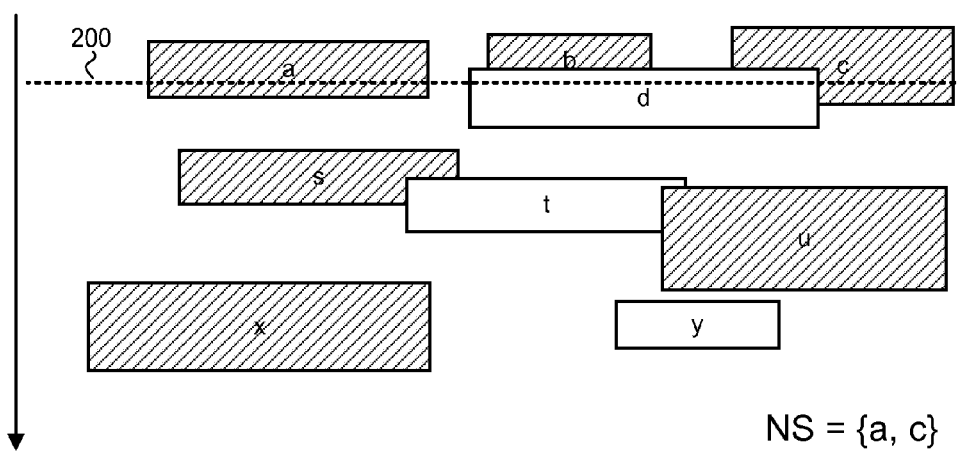
Figure 3G:
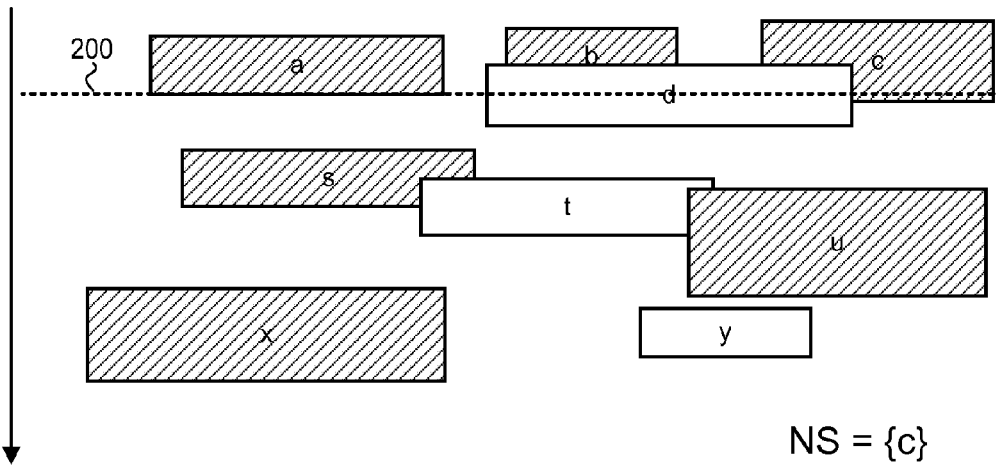
Figure 3H:
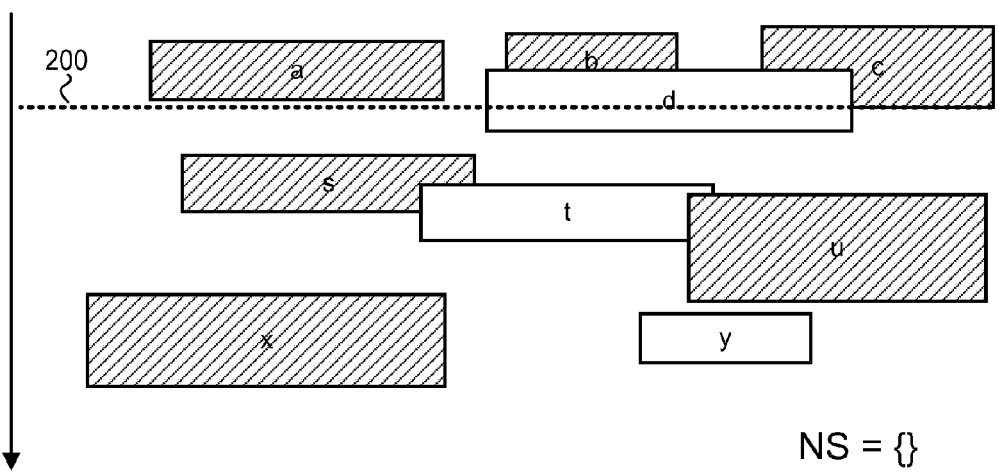

The label placement engine 10 continues to advance the scan line 200 to the bottom edge of label b (FIG. 3F). The label placement engine 10 checks whether label b is in set NS and removes label b from set NS, which now becomes {a, c}. Similarly, as illustrated in FIGS. 3G and 3H, respectively, the label placement engine 20 removes label a from set NS, which then becomes {c}, and then removes label c from set NS to leave it empty.

Figure 3I:
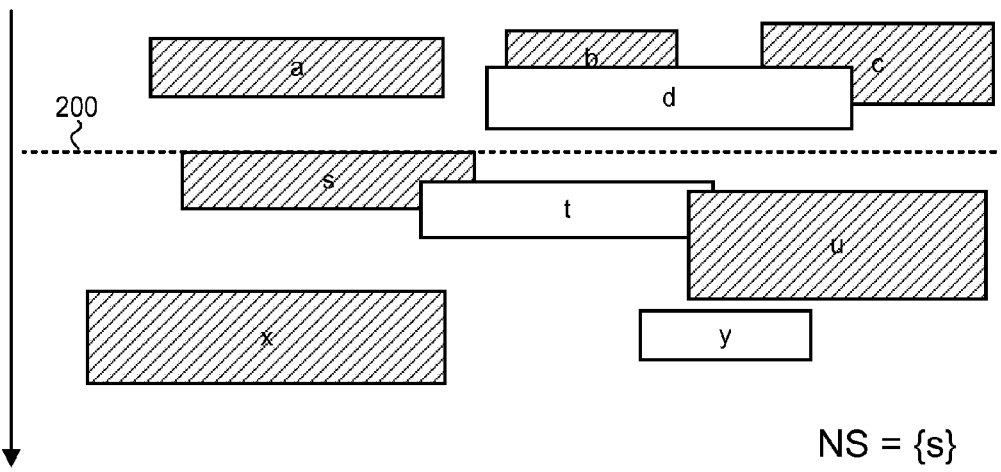
Figure 3J:
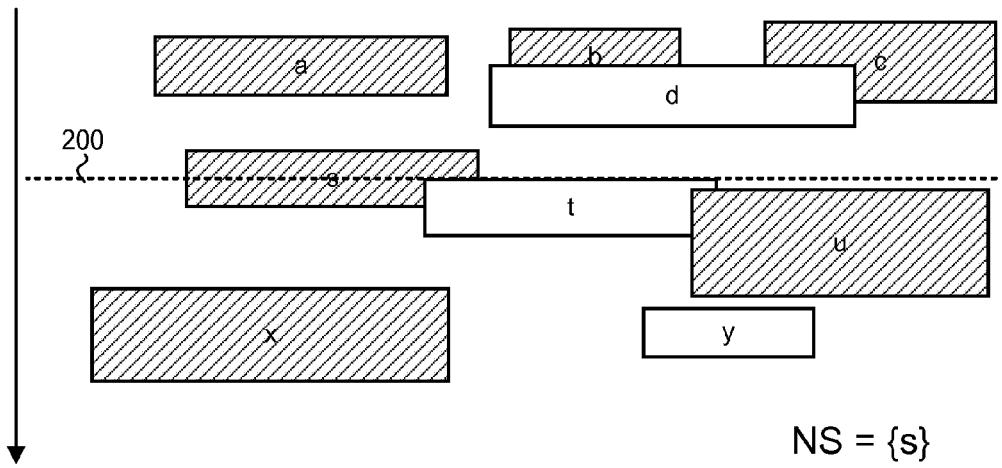
Figure 3K:
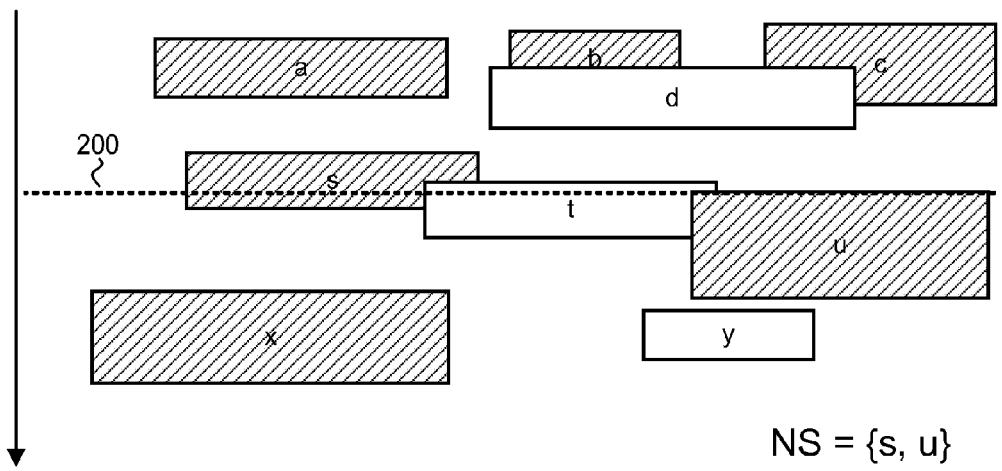
Figure 3L:
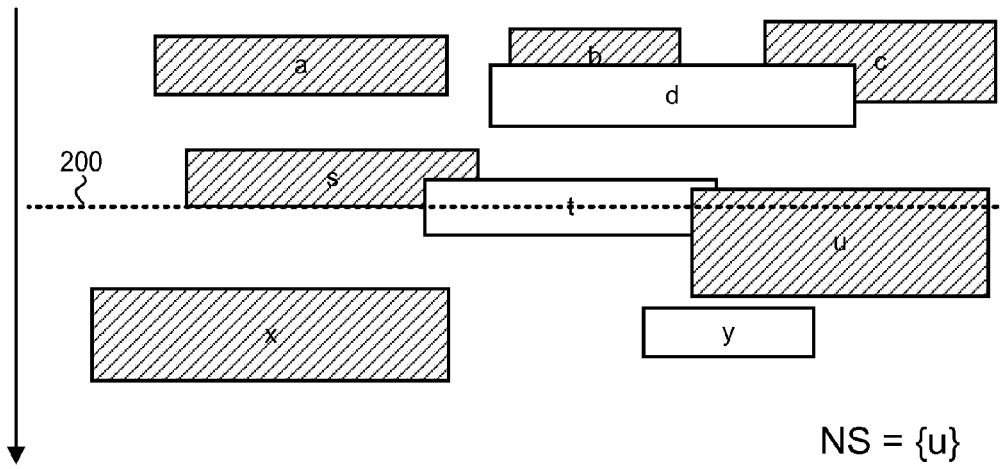
Figure 3M:
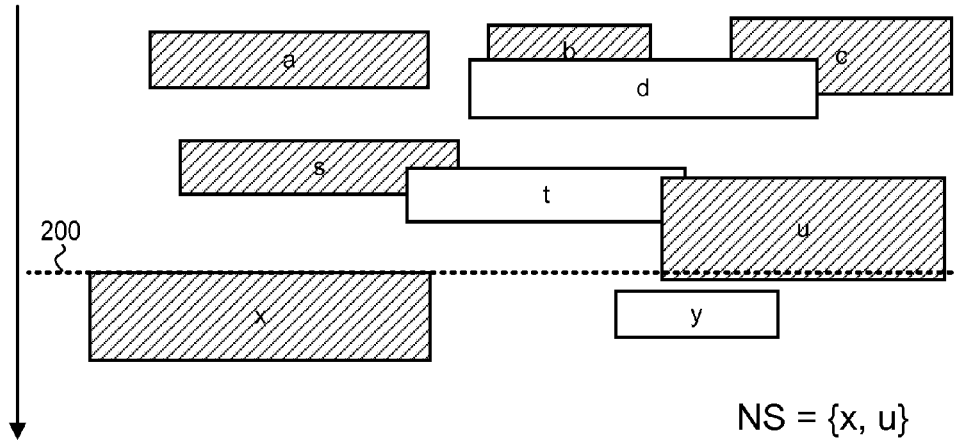
Figure 3N:
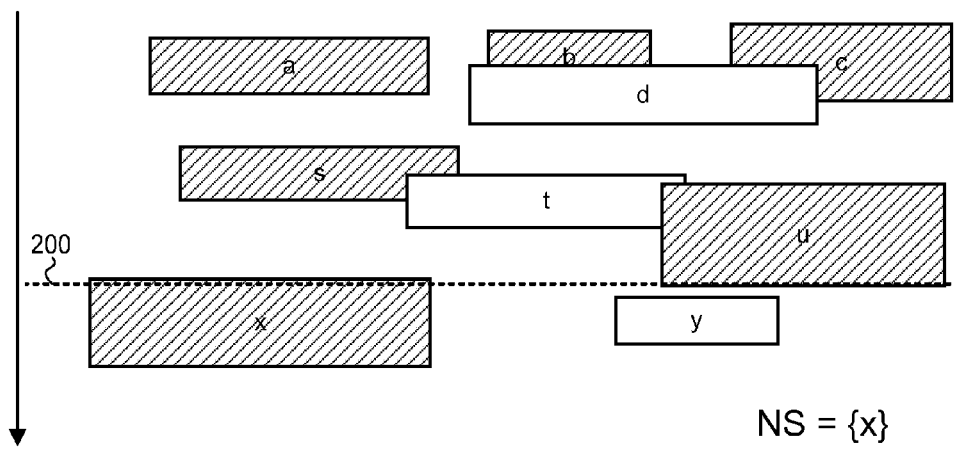

Referring to FIG. 3I, the scan line 200 now reaches the top edge of label s, and set NS becomes {s}. As illustrated in FIG. 3J, the scan line 200 then advances to label t, which the label placement engine 10 does not add to set NS because this label intersects with a label in set NS (i.e., label s). In FIG. 3K, the scan line 200 reaches the top edge of label u, which gets added to set NS, so that NS={s, u}. Next, the label placement engine 10 removes label s from the set when the scan line 200 reaches the bottom edge of label s, so that NS={u}. (FIG. 3L). The scan line 200 now reaches the top edge of label x, and NS={x, u} (FIG. 3M). After label u is removed from the set, NS becomes {x} (FIG. 3N).

Figure 3O:
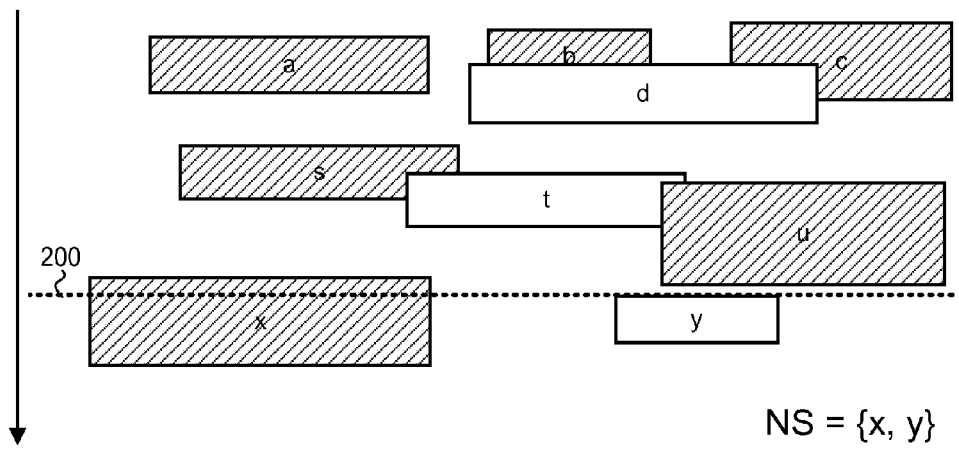
Figure 3P:
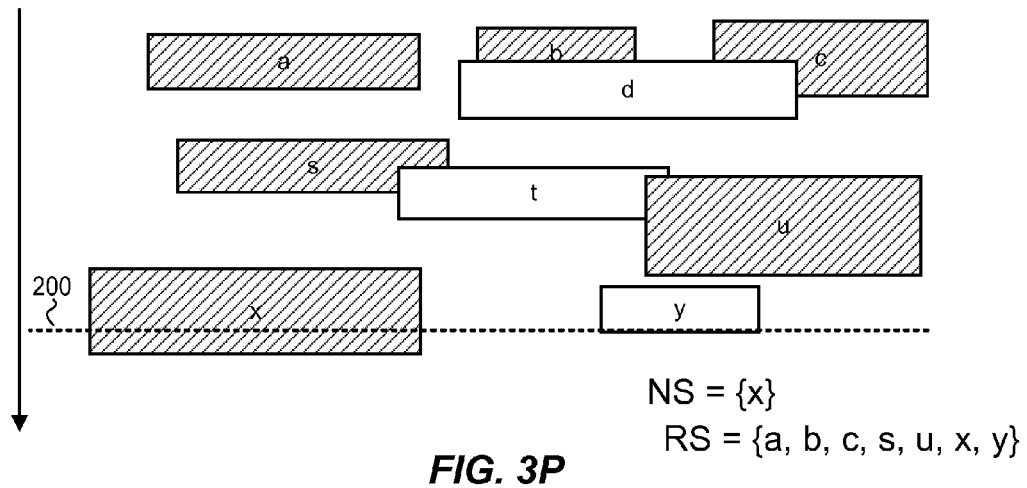
Figure 3Q:
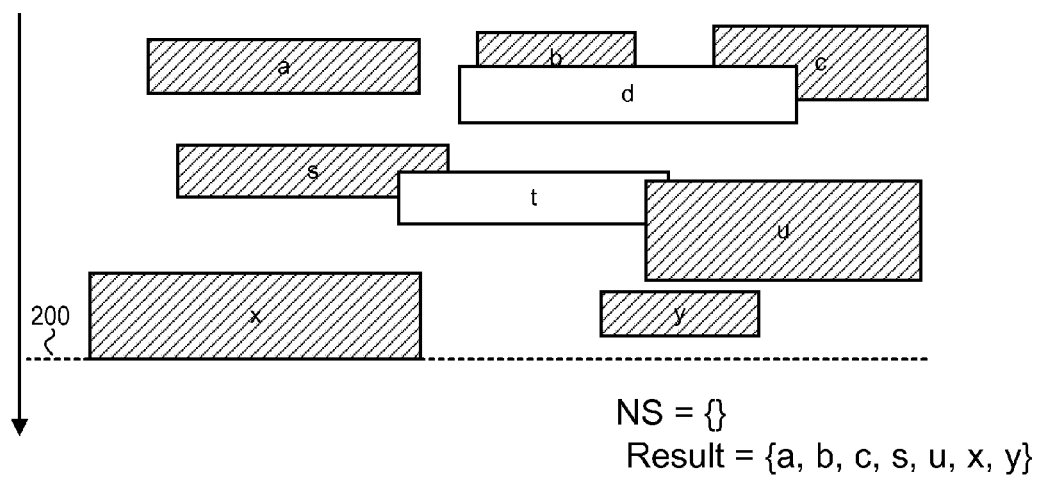

Referring to FIG. 3O, the scan line 200 reaches the top edge of label y. The label placement engine 10 checks whether label y is in result set RS. In other words, the label placement engine 10 checks whether label y was identified as part of the solution during the stage discussed with reference to FIGS. 2A-N. As illustrated in FIG. 2N, the label placement engine 10 had not added label y to result set RS. However, because the projection of label y onto the x-axis does not intersect any projections onto the x-axis of labels currently in set NS, the label placement engine 10 adds label y to set NS, which now becomes {x, y}. When the scan line 200 reaches the bottom edge of label y, the label placement engine 10 removes label y from set NS but adds it to result set RS (FIG. 3P). As illustrated in FIG. 3Q, the scan line 200 finally reaches the bottom edge of label x, which is now removed from set NS, leaving it empty.

Thus, as a result of the refinement stage, the label placement engine 10 in this example configuration identifies an additional label, label y, as part of the solution. As illustrated in FIG. 3Q, all labels from set L, except for labels d and t, have been included in the result set RS={a, b, c, s, u, x, y}.

Figure 4:
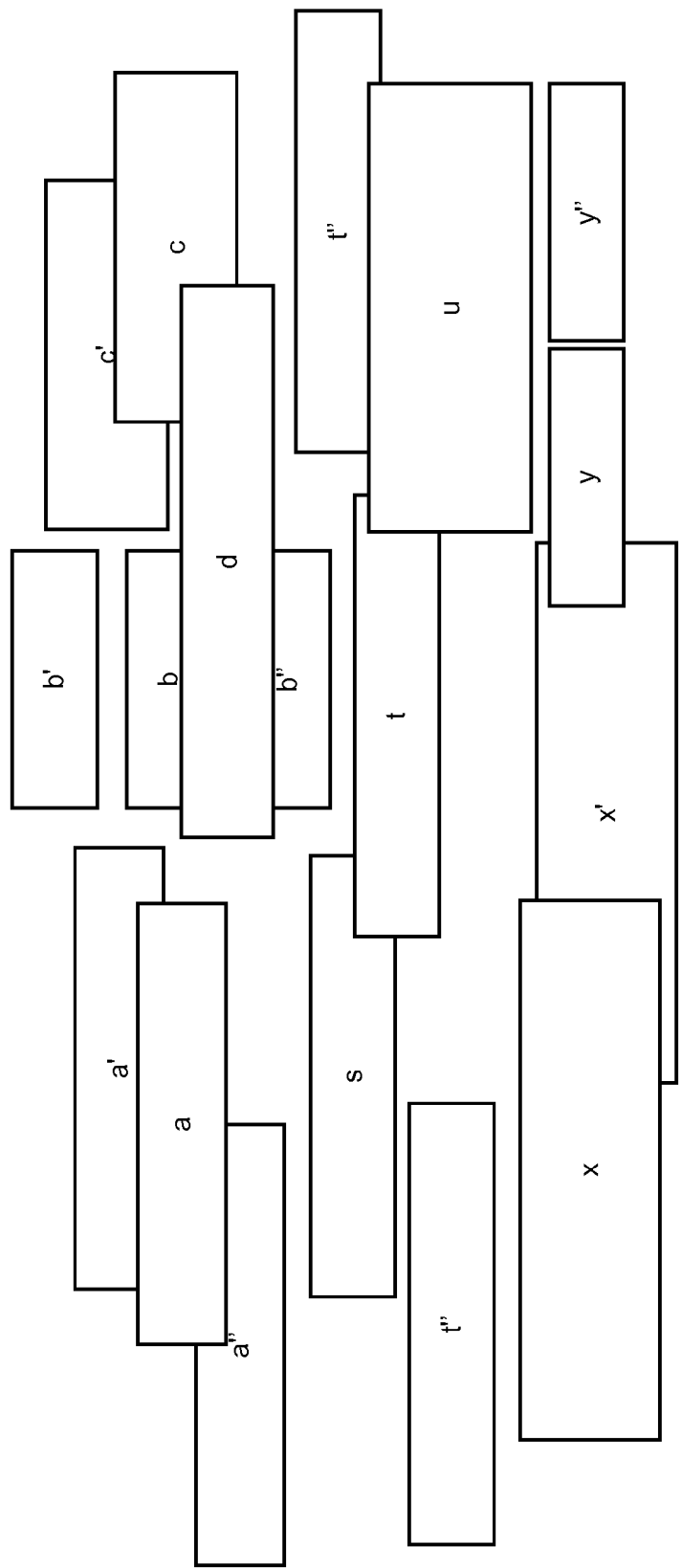
FIG. 4 schematically illustrates application of the algorithm of this disclosure to an example set of labels for which alternative positions are defined, according to one implementation.

Referring back to FIG. 1, label data 14 in some cases can specify alternative positions for some of the labels. Thus, a label may not be a part of a solution in its "primary" position, but may become a part of the solution in one of its alternative positions. To account for these alternatives, the label placement engine 10 can treat each alternative position of label as another candidate label in the initial set L, as illustrated in FIG. 4. Further, the label placement engine 10 can implement additional rules to avoid adding a label in two alternative positions to a result set twice. For example, when adding a label to a result set, the label placement engine 10 can check whether another instance of this label is already in the result set.

Example System in which Label Placement Techniques can be Implemented

Figure 5:
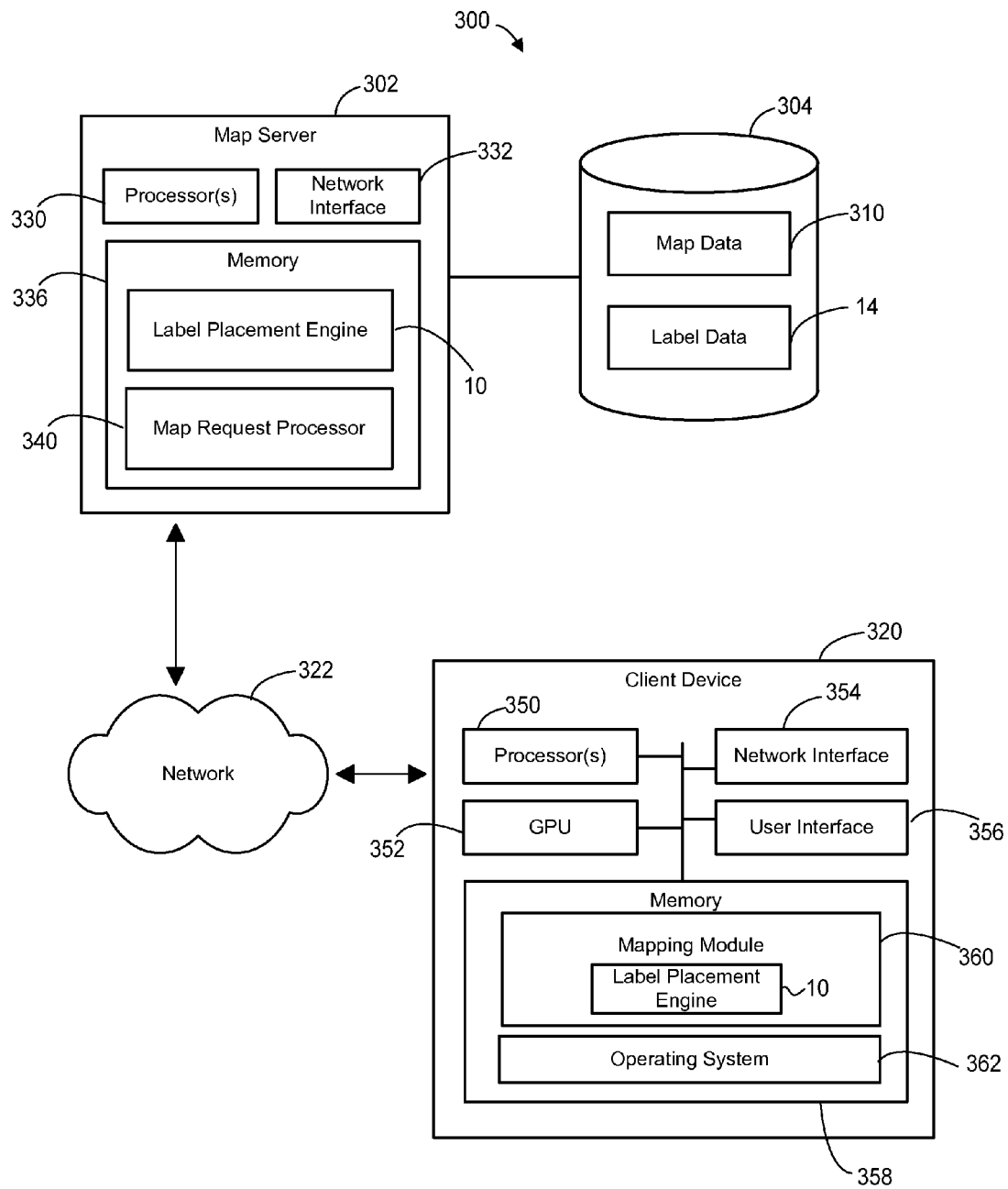
FIG. 5 illustrates an example computing system in which the techniques of this disclosure can be implemented.

FIG. 5 illustrates an example computing system 300 in which the techniques of this disclosure can be implemented. The system 300 includes a map server 302 coupled to a map database 304 which can store map data 310 as well as label data 14. The map server 203 can communicate with client devices, such as a client device 320, via a communication network 322.

The map database 304 in general can store map content such as street and road information, topographic data, satellite imagery, information related to public transport routes, information about businesses or other points of interest (POIs), information about current traffic conditions, etc. The map data 310 can conform to any suitable format or set of formats such as vector graphics, bitmap, etc. In some implementations, the map data 310 is divided into map tiles of a certain size, which can be specific to the zoom level.

As indicated above with reference to FIG. 1, the label data 14 can describe dimensions of labels (e.g., height and width) as well as one or several positions at which these labels can be placed. Further, the label data 14 can indicate the text to be displayed with the corresponding label, various visual characteristics of the label (e.g., color), and metadata such as the zoom level with which the label is associated, for example.

The map server 302 can include processing hardware such as one or more general-purpose processor(s) 330, a network interface 332 to communicate with client devices, and a non-transitory computer-readable storage medium 336, which can include any number of suitable persistent and/or volatile memory components. Depending on the implementation, the memory 336 can be provided in a same device as the map server 302 or a separated device or group of devices. It is also noted that although only one instance of the map server 302 is illustrated in FIG. 5, in general the functionality of the map server 302 discussed herein can be implemented in a single device or a group of devices.

The memory 336 can store instructions that implement a map request processor 340 that receives requests for map data from the client device 320 and other client devices, retrieves the corresponding map data from the database 304, formats and transmits responses to the client devices. The map request processor 340 can also invoke the label placement engine 10 to efficiently determine an efficient selection of labels to be placed on the digital map.

In some implementations or scenarios, rather than selecting labels in response to a specific request, the label placement engine 10 can operate in a batch mode to determine selections of labels for various portions of a digital map and various zoom levels. The map request processor 340 can then respond to requests by retrieving pre-calculated label selections from the map database 304 or another repository.

The client device 320 in general can be any suitable computing device, such as a desktop computer, a smartphone, a tablet computer, or a laptop computer. The client device 320 can include one or more processor(s) 350 such as a central processing unit (CPU), a graphics processing unit (GPU) 352, a network interface 354 to communicate with other devices in a wired and/or wireless manner, a user interface 356 (such as a touchscreen, a keyboard, a microphone, speakers, etc.), and a memory 358 (which can be generally similar to the memory 336). The client device 320 in some implementations can include fewer components than illustrated in FIG. 5 or, conversely, include additional components (omitted here for simplicity). For example, the client device 320 can be equipped with a positioning module such as Global Positioning System (GPS) chip.

A digital mapping module 360 can be stored in the memory 358 as sets of instructions executable on the one or more processor(s) 350 and/or the GPU 352. The digital mapping module 360 can be a special-purpose application available at an online application store disposed at the map server 302 or an application server (not shown). A user of the client device 320 may retrieve a copy of the digital mapping module 360 from the application server and install the retrieved copy of the mapping application on the client device 320. In other implementations, the digital mapping module 360 can be a software component, such as a plug-in, that operates in a web browser or another application. In addition to the digital mapping module 360, the memory 358 can store an operating system (OS) 362 as well as various software components.

In some implementations, an instance of the label placement engine 10 can execute on the client device 320 as a component of the digital mapping module 360 instead of, or in addition to, executing on the map server 302. It is noted that because the algorithm of this disclosure has the response of O(n log n), the label placement engine 10 implemented in the client device 320 can operate in real time without causing noticeable delays in rendering digital maps. More generally, the label placement engine 10 can be implemented on a client device, a network server, or both.

Flow Diagrams of Example Label Placement Methods

Figure 6:
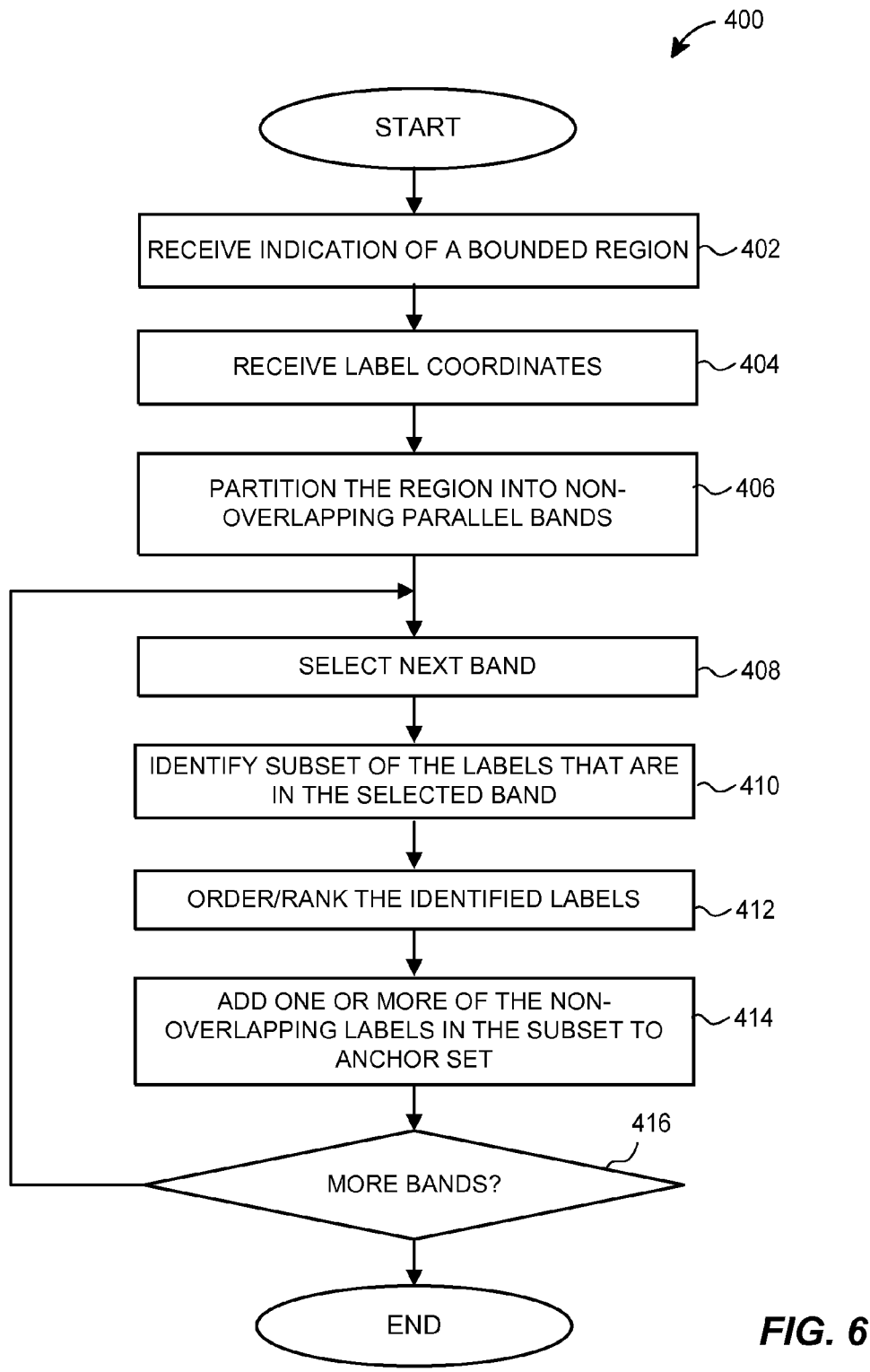
FIG. 6 is a flow diagram of an example method for selecting a set of non-overlapping labels within one of the bands into which a region is divided, which can be implemented in the label placement engine of FIG. 1.

FIG. 6 is a flow diagram of an example method 400 for selecting a set of non-overlapping labels, which can be implemented as a set of instructions in the label placement engine 10 of FIG. 1, for example.

The method 400 begins at block 402, when an indication of a bounded region is received. The region can be shaped as a rectangle, for example. The indication can include the dimensions of a region and/or geographic coordinates of the corners of the region. A description of labels is received at block 404. In an example implementation, the description of each label includes the height and the width of the rectangular shape corresponding to the label and the coordinates at which the label is to be placed within the bounded region. As a more specific example, the coordinates can specify the position of the lower left corner of the label, so that the coordinates of the other corners can be trivially determined using the height and width.

Generally speaking, labels need not be rectangular and can be shaped as circles, ovals, hexagons, etc. In these cases, the label placement engine 10 or another suitable component can inscribe the shapes into respective bounding rectangles and carry out the other steps of the algorithms as described in this disclosure. Further, as used herein, the term "substantially rectangular" refers to a shape that has easily identifiable vertical and horizontal edges but is not necessarily a rectangle, such as a rectangle transformed by rounding off or tapering the corners, for example.

At block 406, the bounded region is portioned into contiguous non-overlapping parallel bands. In an example implementation, these bands are horizontal bands of the same height at least approximately corresponding to the average height of the labels.

According to the method 400, blocks 408-416 can be executed multiple times until each of the bands has been processed. First, the next band is selected at block 408. At block 410, a subset of labels at least partially disposed in the selected band are identified. The identified labels are ordered or ranked at block 412. For example, as discussed above with reference to FIGS. 2A-N, the labels can be ordered based on the left x-coordinate, so that a label with the left x-coordinate $x_1$ has a higher rank than a label with the left x-coordinate $x_2$ if $x_1 < x_2$. After the labels identified at block 412 are ordered, these labels can be iteratively processed to populate an anchor set (block 414). Example processing that can be carried out at block 414 is discussed below with reference to FIG. 7. If more bands are available (block 416), the flow returns to block 408. Otherwise, the method 400 ends.

Figure 7:
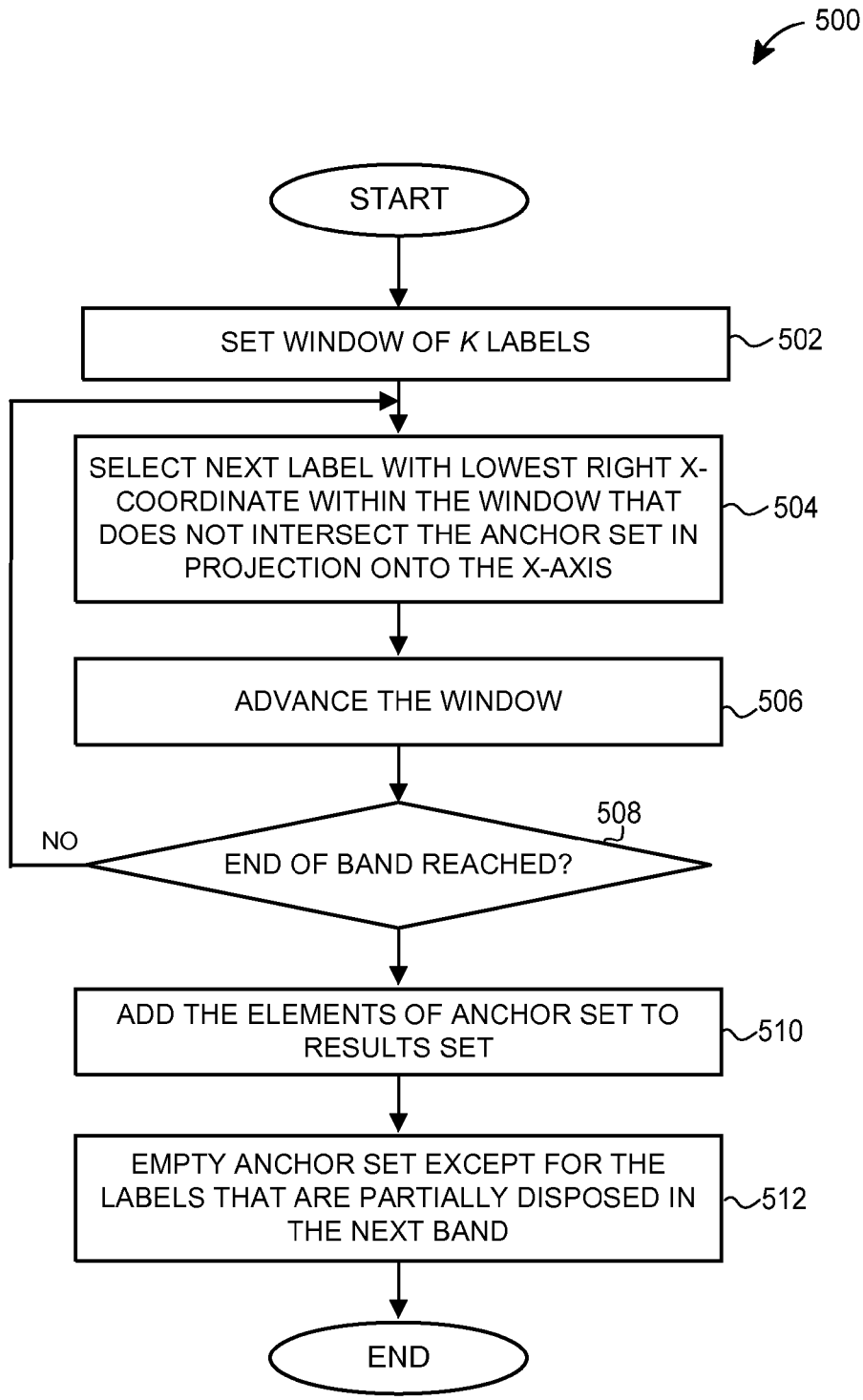
FIG. 7 is a flow diagram of an example method for selecting several labels within a moving window, which can be implemented as part of the method of FIG. 6.

Referring now to FIG. 7, the method 500 can be applied to a set of ordered labels such as those identified at block 412, as discussed above. At block 502, a set of K labels is selected in view of the order of the labels. For example, if 20 labels $L_1$, $L_2$, ... $L_{20}$ were ordered at block 412 discussed above, and K=5, labels $L_1$-$L_5$ are selected when block 502 is executed for the first time, labels $L_2$-$L_6$ are selected when block 502 is executed for the second time, labels $L_3$-$L_7$ are selected when block 502 is executed for the third time, etc. In the second-to-last iteration, only labels $L_{19}$ and $L_{20}$ are selected, and in the last iteration, only label $L_{20}$ is selected. Thus, in a sense, the method 500 advances a window of up to K elements through the ordered set of labels identified within a band.

At block 504, a label with the lowest right x-coordinate is selected from among the labels in the window and added to the anchor set, as long as the label does not intersect any of the labels in the anchor set in its projection onto the x-axis. The window then advances at block 506. If it is determined at block 508 that there are labels that remain to be processed, the flow returns to block 504. Otherwise, the flow proceeds to block 510, where all the elements of the anchor set are added to the result set.

At block 512, the anchor is emptied, except for those labels that straddle the boundary between the current band and the next band. In other words, labels that are partially disposed in the next band are left in the anchor set.

Figure 8:
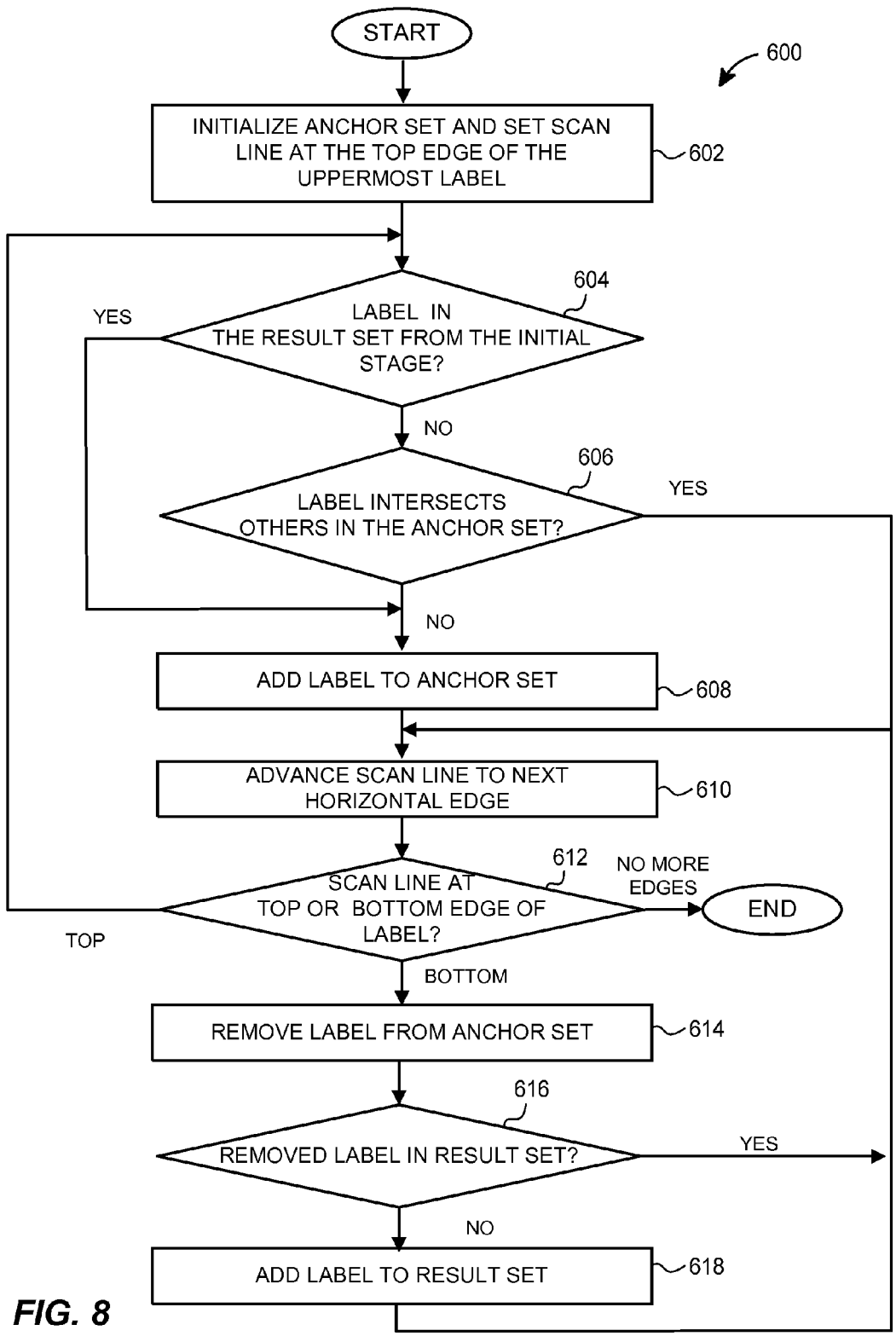
FIG. 8 is a flow diagram of an example method for refining a solution generated by the method of FIG. 6, which also can be implemented in the label placement engine of FIG. 1.

Now referring to FIG. 8, a method 600 for refining a solution generated by the method of FIG. 6 can be implemented in the label placement engine 10 as a refinement stage of the algorithm. The method 600 can be applied for a set of candidate labels in a bounded region, where a result set is already populated as part of executing Similar to the methods 400 and 500, the method 600 can be implemented as a set of instructions executable by one or more processors.

The method 600 begins at block 602, when an anchor set is initialized and a scan line is set at the top edge of the uppermost label in the bounded region. The method 600 then determines, at block 604, whether the label is already included in the result set. If the label is in the result set, the flow proceeds to block 608, where the label is added to the anchor set. Otherwise, if the label is not yet in the anchor set, the method 600 determines whether the label intersects any of the labels in the anchor set in the projection on the x-axis (block 606). If the label does not intersect any labels in the anchor set, the label is added to the anchor set at block 608. Otherwise, the flow proceeds to block 610, where the scan line advances to the next horizontal edge, which may be the top edge of a label or the bottom edge of a label.

If the scan line is now at a top edge of a label (block 612), the flow returns to block 604 to determine whether it should be added to the anchor set. If the scan line is now at a bottom edge of a label, the flow proceeds to block 614. The method 600 ends when there are no more horizontal edges to process, i.e., when the scan line has advanced past all the candidate labels.

At block 614, the label whose bottom edge has been reached by the scan line is removed from the anchor set. If the removed label is in the result set (block 616), the flow returns to block 610. If the removed label is not yet in the result set, the label is added to the result set at block 618. The flow then returns to block 610.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for efficiently selecting sets of non-intersecting labels through the disclosed principles herein. Thus, while particular embodiments and applications have been illustrated and described, it is to be understood that the disclosed embodiments are not limited to the precise construction and components disclosed herein.

What is claimed is:

1. A system for placing labels on digital maps in a non-overlapping manner, the computing system comprising:
   a non-transitory computer-readable memory storing thereon indications of dimensions and positions for a plurality of candidate labels for placing within a bounded region of a digital map;
   processing hardware coupled to the computer-readable memory, the processing hardware configured to:
      partition the bounded region into a plurality of bands parallel to an axis;
      for each of the plurality of bands: (i) identify a respective subset of the plurality of candidate labels, wherein each label in subset is at least partially disposed in the band, and (ii) iteratively select non-overlapping labels from the subset based at least on one of the edges of the labels in the subset perpendicular to the axis;
      generate a result set using the respective selections of non-overlapping labels for plurality of bands; and
      cause the labels in the result set to be placed on the digital map.

2. The system of claim 1, wherein the processing hardware is further configured to, for each of the plurality of bands, to (iii) determine an order of the labels in the subset based at least on the positions of the labels, wherein the processing hardware is configured to select the non-overlapping labels in the band based at least in part on the determined order.

3. The system of claim 2, wherein:
   the axis to which the plurality of bands are parallel is the x-axis;
   each of the plurality of candidate labels has a substantially rectangular shape;
   the processing hardware is configured to determine the order of the labels in the subset based on the respective left x-coordinates of the labels.

4. The system of claim 3, wherein to iteratively select the non-overlapping labels from the subset processing hardware is further configured to:
   select a group of first K of the labels in the subset based on the determined order, identify, from among the K selected labels, a label with the lowest right x-coordinate, add the identified label to an anchor set if a projection of the identified label onto the x-axis does not intersect with projections onto the x-axis of labels already in the anchor set, and select a next group of K labels in the subset based on the determined order, wherein the first label in the next group lies to the right of the right x-coordinate of the identified label.

5. The system of claim 1, wherein the processing hardware is further configured to:

initialize an anchor set to be empty prior to processing the plurality of bands, for each of the plurality of bands, iteratively add the selected labels to the anchor set if a label being added does not intersect labels already in the anchor set, and augment the result set by the anchor set when the band has been processed.

6. The system of claim 5, wherein the processing hardware is further configured to:

when the band has been processed, remove from the anchor set only those one or more labels that are wholly contained within the band.

7. The system of claim 1, wherein the processing hardware is further configured to, subsequently to generating the result set:

advance a virtual scan line in a direction perpendicular to the axis to the plurality of bands parallel, identify one or more of the plurality of candidate labels that (i) do not intersect any of the labels in the result set and (ii) are not already included in the result set, and add the one or more of the plurality of candidate labels to the result set.

8. The system of claim 7, wherein to identify the one or more of the plurality of candidate labels to be added to the result set, the processing hardware is configured to:

when the scan line is aligned with a top edge of a label, add the label to a temporary set if the label is included in the result set or if the label does not intersect any labels already included in the temporary set, and when the scan line is aligned with a bottom edge of a label, remove the label from the temporary set, including add the label to the result set if the label is not already included in the result test.

9. The system of claim 1, wherein to partition the bounded region into the plurality of bands, the processing hardware is configured to determine an average height of the plurality of candidate labels, wherein the height of the plurality of bands is a function of the determined average height.

10. A method for placing labels on digital maps in a non-overlapping manner, the computing system comprising:

receiving, by one or more processors, indications of dimensions and positions for a plurality of candidate labels for placing within a bounded region of a digital map;

partitioning, by the one or more processors, the bounded region into a plurality of bands parallel to an axis;

for each of the plurality of bands:

identifying, by the one or more processors, a respective subset of the plurality of candidate labels, wherein each label in subset is at least partially disposed in the band, and iteratively selecting, by the one or more processors, non-overlapping labels from the subset based at least on one of the edges of the labels in the subset perpendicular to the axis;

generating, by the one or more processors, a result set using the respective selections of non-overlapping labels for the plurality of bands; and causing the labels in the result set to be placed on the digital map.

11. The method of claim 10, further comprising, for each of the plurality of bands:

determining, by the one or more processors, an order of the labels in the subset based at least on the positions of the labels, and selecting, by the one or more processors, the non-overlapping labels in the band based at least in part on the determined order.

12. The method of claim 11, wherein:

the axis to which the plurality of bands are parallel is the x-axis;

each of the plurality of candidate labels has a substantially rectangular shape; the method further comprising:

determining, by the one or more processors, the order of the labels in the subset based on the respective left x-coordinates of the labels.

13. The method of claim 12, wherein to iteratively select the non-overlapping labels from the subset processing hardware, the method includes:

selecting, by the one or more processors, a group of first K of the labels in the subset based on the determined order, identifying, from among the K selected labels, a label with the lowest right x-coordinate, by the one or more processors, adding the identified label to an anchor set if a projection of the identified label onto the x-axis does not intersect with projections onto the x-axis of labels already in the anchor set, by the one or more processors, and selecting a next group of K labels in the subset based on the determined order, by the one or more processors, wherein the first label in the next group lies to the right of the right x-coordinate of the identified label.

14. The method of claim 10, further comprising:

initializing, by the one or more processors, an anchor set to be empty prior to processing the plurality of bands, for each of the plurality of bands, iteratively adding the selected labels to the anchor set if a label being added does not intersect labels already in the anchor set, and augmenting the result set by the anchor set when the band has been processed, by the one or more processors.

15. The method of claim 14, further comprising: when the band has been processed, removing from the anchor set only those one or more labels that are wholly contained within the band, by the one or more processors.

16. The method of claim 10, further comprising subsequently to generating the result set:

advancing, by the one or more processors, a virtual scan line in a direction perpendicular to the axis to the plurality of bands parallel, identifying, by the one or more processors, one or more of the plurality of candidate labels that (i) do not intersect any of the labels in the result set and (ii) are not already included in the result set, and adding, by the one or more processors, the one or more of the plurality of candidate labels to the result set.

17. The method of claim 16, wherein to identify the one or more of the plurality of candidate labels to be added to the result set, the method comprises:

when the scan line is aligned with a top edge of a label, adding the label to a temporary set if the label is included in the result set or if the label does not intersect any labels already included in the temporary set, by the one or more processors; and when the scan line is aligned with a bottom edge of a label, removing the label from the temporary set, including adding the label to the result set if the label is not already included in the result test, by the one or more processors.

18. The method of claim 10, wherein to partition the bounded region into the plurality of bands, the method includes determining, by the one or more processors, an average height of the plurality of candidate labels, wherein the height of the plurality of bands is a function of the determined average height.

19. A method for efficiently selecting non-overlapping shapes from candidate shapes, the method comprising:
- receiving, by one or more processors, shape data indicating positions and dimensions for a plurality of candidate substantially rectangular shapes for placement within a bounded region;
- generating, by the one or more processors, a result set including several of the plurality of candidate shapes, wherein each shape in the result set does not overlap any of the other shapes in the subset, by separately processing subsets of the plurality of shapes corresponding to respective ones of a plurality of virtual parallel bands that make up the bounded region; and
- augmenting, by the one or more processors, the result set with a shape included in the plurality of candidate shapes that does not overlap any of the shapes in the result set, by advancing a virtual scan line in a direction perpendicular to an orientation of the plurality of virtual parallel bands.

20. The method of claim 19, wherein generating the result set includes:
- determining, for each of the subsets, an order of the shapes within the corresponding band, based at least on positions of the shapes, by the one or more processors, and
- selecting, by the one or more processors, non-overlapping shapes within the band using the determined order.

* * * * *